UNITED STATES PATENT OFFICE.

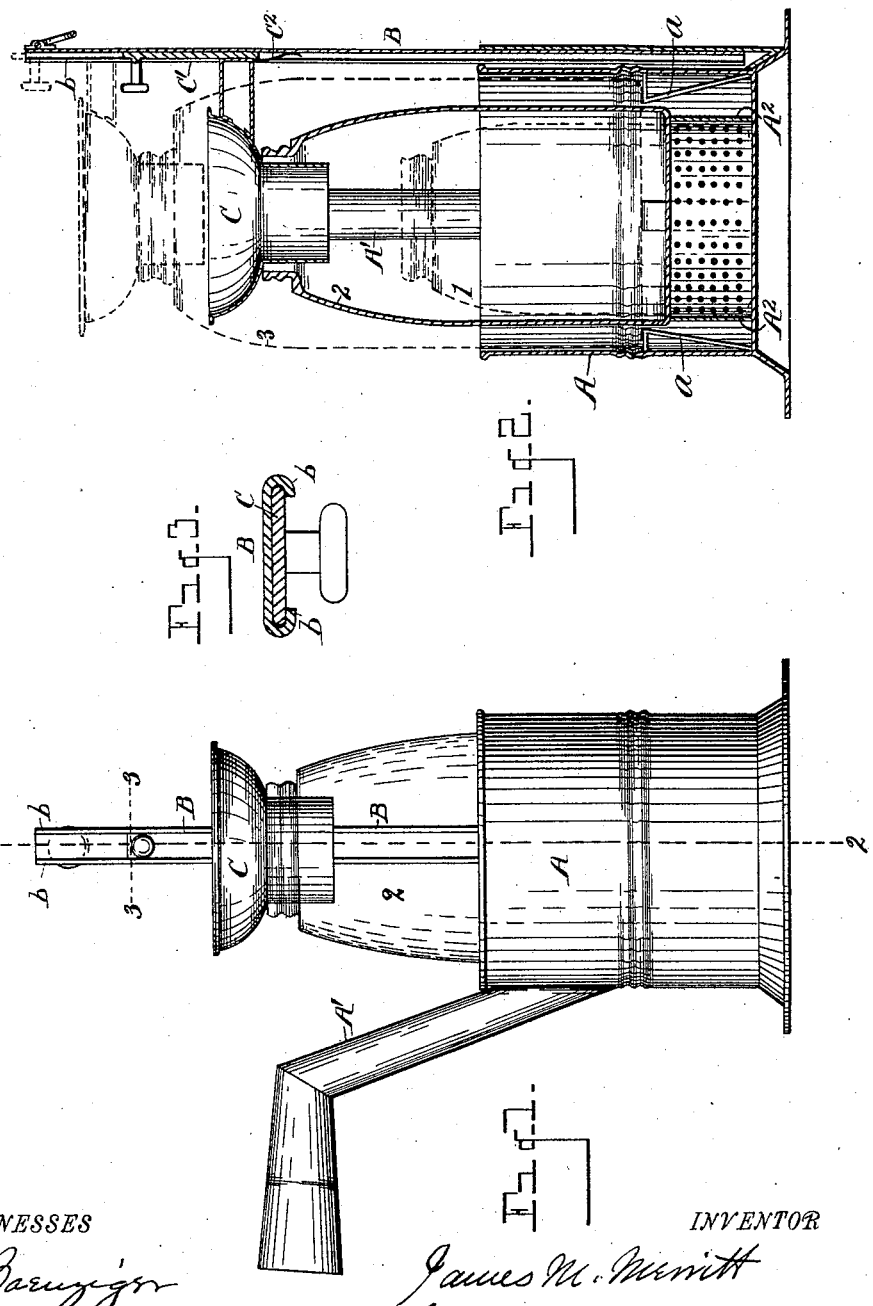

JAMES M. MERRITT, OF HOMER, MICHIGAN.

CAN OR JAR FILLER.

SPECIFICATION forming part of Letters Patent No. 574,849, dated January 5, 1897.

Application filed March 21, 1896. Serial No. 584,246. (No model.)

*To all whom it may concern:*

Be it known that I, JAMES M. MERRITT, a citizen of the United States, residing at Homer, county of Calhoun, State of Michigan, have invented a certain new and useful Improvement in Can or Jar Fillers; and I declare the following to be a full, clear, and exact description of the invention, such as will enable others skilled in the art to which it appertains to make and use the same, reference being had to the accompanying drawings, which form a part of this specification.

My invention has for its object to provide a jar or can filler by means of which fruit-jars may be conveniently filled; and it consists of the construction, combination, and arrangement of devices hereinafter described and claimed, and illustrated in the accompanying drawings, in which—

Figure 1 is a side elevation. Fig. 2 is a vertical section on the line 2 2, Fig. 1. Fig. 3 is a cross-section on the line 3 3, Fig. 1.

It is well understood that in the operation of filling glass fruit-jars it has been customary to heat the jars by placing them in vessels of hot water and then to pour the fruit therein in a heated condition, rendering the jar so hot as to be inconveniently handled. My invention aims to overcome these difficulties and to provide means for filling the jars or cans in a convenient and expeditious manner.

I carry out my invention as follows:

A represents a vessel or receptacle of any suitable form to receive the jars or cans, the same being preferably provided with a handle A'. B is a standard engaged with said receptacle and rising thereabove, as shown. C is a funnel supported on said standard and being preferably adjustable thereupon, so as to be raised or lowered in the required position. To this end the funnel is preferably connected with a slide C', engaged in guide-flanges $b$ of the standard, the slide being provided with a spring, (indicated at $C^2$,) so that the slide shall have a spring tension in its engagement with the standard, whereby the slide and the funnel connected therewith will be held in a given position of adjustment. The funnel is intended to be raised in order to engage a jar in the receptacle A, when the funnel will be lowered so that its base will project into the open mouth of the jar or can in readiness for filling the same.

To adapt the receptacle to receive and support various sizes of jars or cans and to hold them in a firm position and so that the funnel will center over the mouths of jars or cans of various sizes, I prefer to construct the receptacle so as to engage therein cans or jars of standard sizes of different capacities.

In Fig. 2 I have indicated in dotted lines a jar 1, also a jar 2 in full lines, and an additional larger jar 3 in dotted lines, the receptacle being constructed, in the instance shown, to receive and hold jars of these three different sizes. My invention, however, contemplates, in combination, a receptacle to contain one or more jars of any desired number. Accordingly I have shown at the base of the receptacle a collar or flange $A^2$ of suitable diameter to receive the smallest-sized jar, No. 1. This collar I prefer to perforate, so that water within the receptacle will circulate freely therewithin and about a jar held in place thereby. This collar $A^2$ is concentric with the wall of the receptacle A, so that when a jar is located therewithin the mouth of the jar will be centered for the adjustment of the funnel thereinto. At the same time the collar $A^2$ serves as a seat for a larger-sized jar or can, as the jar No. 2. About the collar $A^2$ and projecting thereabove are a series of steps or brackets $a$, which may be radially secured to the inner wall of the receptacle A, said steps or brackets $a$ projecting toward the center of the receptacle sufficiently to form bearings against jar No. 2, resting upon the collar $A^2$, said steps or brackets serving to center the jar or can 2 so that its mouth will be in position to receive the filler. At the same time said steps or brackets $a$ serve also as supports for an additional can or jar, as the jar 3, the wall of the receptacle A centering jar No. 3 to receive the funnel. Thus by means of the collar $A^2$, the steps or brackets $a$, and the inner wall of the receptacle A all three of the jars or cans 1 2 3 may be supported and centered under the funnel, so that by the adjustment of the funnel upon its supporting-standard the mouth of the funnel will readily enter the mouth of each of the jars, as may be desired.

I do not limit myself solely to the particular means herein shown and described to support and center jars of various sizes within a receptacle, as my invention contemplates as coming within its scope any desired means for so supporting and centering a multiple number of jars within a receptacle, and my invention contemplates also as coming within its scope a receptacle capable of receiving a jar or can without any guides or centering devices thereabout, inasmuch as jars of various sizes might be centered by hand under the mouth of the funnel. So, also, I do not limit myself solely to the particular means herein shown and described for adjusting the funnel upon the standard.

The operation of the device will now be understood.

What I claim as my invention is—

1. In a jar or can filler, the combination of a vessel constructed to hold a multiple number of jars or cans of various sizes, a standard rising thereabove, an adjustable funnel-support on the standard above the vessel, and means to center jars or cans of various sizes in said receptacle, substantially as set forth.

2. A jar or can filler, having in combination, a vessel having a base to receive and support a can or jar, means rising above said base to support an additional jar of a different size, a standard rising above the vessel, and a funnel-support upon said standard arranged to be centered over the mouths of various-sized jars supported within said receptacle, for the purpose set forth.

In testimony whereof I sign this specification in the presence of two witnesses.

JAMES M. MERRITT.

Witnesses:
 A. E. KNIGHT,
 BENJ. F. GOODRICH.